United States Patent
Otsuki

Patent Number: 5,651,097
Date of Patent: Jul. 22, 1997

[54] GRADE ARITHMETIC UNIT AND INPUT VALUE SORTER USED THEREIN

[75] Inventor: Satoshi Otsuki, Ikeda, Japan

[73] Assignee: Ricoh Company, Ltd., Tokyo, Japan

[21] Appl. No.: 463,065

[22] Filed: Jun. 5, 1995

Related U.S. Application Data

[63] Continuation of Ser. No. 105,335, Aug. 10, 1993, abandoned.

[30] Foreign Application Priority Data

Aug. 11, 1992 [JP] Japan .................. 4-236558
Oct. 23, 1992 [JP] Japan .................. 4-309494

[51] Int. Cl.$^6$ .................................................. G06G 7/00
[52] U.S. Cl. .................................. 395/3; 395/900
[58] Field of Search .......................... 395/3, 10, 51, 395/61, 900

[56] References Cited

U.S. PATENT DOCUMENTS

| | | | |
|---|---|---|---|
| 4,875,184 | 10/1989 | Yamakawa | 395/3 |
| 5,243,687 | 9/1993 | Ando et al. | 395/3 |
| 5,245,698 | 9/1993 | Matsunaga | 395/61 |
| 5,343,553 | 8/1994 | Miyazawa et al. | 395/3 |
| 5,377,308 | 12/1994 | Inoue et al. | 395/61 |

FOREIGN PATENT DOCUMENTS

| | | | |
|---|---|---|---|
| 63-113732 | 5/1988 | Japan | G06F 9/44 |
| 5-12022 | 1/1993 | Japan | G06F 9/44 |

OTHER PUBLICATIONS

"VLSI Realization of Fuzzy Inference Mechanism", Electronic Information Communication Association, vol. J71-A, No. 2, 1989, pp. 179-187.

Yamaguchi et al, "Fuzzy adaptive control with an associative memory system"; International conference on control '91, pp. 944-949 vol. 2, 25-28 Mar. 1991.

*Primary Examiner*—Tariq R. Hafiz
*Attorney, Agent, or Firm*—Cooper & Dunham LLP

[57] ABSTRACT

An input value sorter for calculating a conformity grade in a fuzzy inferential device has a comparator for sequentially receiving data indicative of a position of each of vertexes of a membership function defined as a polygon and receiving fact data. The comparator sequentially compares the fact data showing a determined value with the data indicative of the position of each of the vertexes. The input value sorter also has a device for specifying a side or vertex of the polygon belonging to the fact data on the basis of compared results of the comparator and an input order of the vertexes. A grade arithmetic unit has this input value sorter. In this grade arithmetic unit, the membership function can be suitably sorted by a simplified construction.

6 Claims, 8 Drawing Sheets

Fig. 2

| MEMBERSHIP FUNCTION NAME | ADDRESS | ADDRESS CODE | | | | | | | | | | DATA (GRADE VALUE) | | | |
|---|---|---|---|---|---|---|---|---|---|---|---|---|---|---|---|
| | | RULE POSITION | | | | DISCRETE POSITION | | | | | | | | | |
| | | $A_9$ | $A_8$ | $A_7$ | $A_6$ | $A_5$ | $A_4$ | $A_3$ | $A_2$ | $A_1$ | $A_0$ | $O_3$ | $O_2$ | $O_1$ | $O_0$ |
| $R_1$ | 0 | 0 | 0 | 0 | 0 | 0 | 0 | 0 | 0 | 0 | 0 | 0 | 0 | 0 | 0 |
| | 1 | 0 | 0 | 0 | 0 | 0 | 0 | 0 | 0 | 0 | 1 | 0 | 0 | 0 | 0 |
| | 2 | 0 | 0 | 0 | 0 | 0 | 0 | 0 | 0 | 1 | 0 | 0 | 0 | 0 | 1 |
| | 3 | 0 | 0 | 0 | 0 | 0 | 0 | 0 | 0 | 1 | 1 | 0 | 0 | 1 | 0 |
| | ⋮ | | | | | | | | | | | | | | |
| | 39 | 0 | 0 | 0 | 0 | 1 | 0 | 0 | 1 | 1 | 1 | 1 | 0 | 1 | 1 |
| | 40 | 0 | 0 | 0 | 0 | 1 | 0 | 1 | 0 | 0 | 0 | 1 | 0 | 1 | 0 |
| | 41 | 0 | 0 | 0 | 0 | 1 | 0 | 1 | 0 | 0 | 1 | 1 | 0 | 0 | 1 |
| | ⋮ | | | | | | | | | | | | | | |
| | 63 | 0 | 0 | 0 | 0 | 1 | 1 | 1 | 1 | 1 | 1 | 0 | 0 | 0 | 0 |
| $R_2$ | 64 | 0 | 0 | 0 | 1 | 0 | 0 | 0 | 0 | 0 | 0 | 0 | 0 | 0 | 0 |
| | 104 | 0 | 0 | 0 | 1 | 1 | 0 | 1 | 0 | 0 | 0 | 0 | 0 | 1 | 1 |
| | 127 | 0 | 0 | 0 | 1 | 1 | 1 | 1 | 1 | 1 | 1 | 0 | 0 | 0 | 0 |
| $R_3$ | 128 | 0 | 0 | 1 | 0 | 0 | 0 | 0 | 0 | 0 | 0 | 0 | 0 | 0 | 0 |
| | 164 | 0 | 0 | 1 | 0 | 1 | 0 | 1 | 0 | 0 | 0 | 0 | 1 | 1 | 0 |
| | 191 | 0 | 0 | 1 | 0 | 1 | 1 | 1 | 1 | 1 | 1 | 0 | 0 | 0 | 0 |
| $R_4$ | 192 | 0 | 0 | 1 | 1 | 0 | 0 | 0 | 0 | 0 | 0 | 0 | 0 | 0 | 0 |
| | 232 | 0 | 0 | 1 | 1 | 1 | 0 | 0 | 0 | 0 | 0 | 0 | 1 | 0 | 0 |
| | 255 | 0 | 0 | 1 | 1 | 1 | 1 | 1 | 1 | 1 | 1 | 0 | 0 | 0 | 0 |
| ⋮ | ⋮ | | | | | ⋮ | | | | | | ⋮ | | | |
| $R_{16}$ | 860 | 1 | 1 | 1 | 1 | 0 | 0 | 0 | 0 | 0 | 0 | 0 | 0 | 0 | 0 |
| | 1000 | 1 | 1 | 1 | 1 | 1 | 0 | 1 | 0 | 0 | 0 | 1 | 0 | 0 | 1 |
| | 1023 | 1 | 1 | 1 | 1 | 1 | 1 | 1 | 1 | 1 | 1 | 0 | 0 | 0 | 0 |

| | | | |
|---|---|---|---|
| if | $L(t_1)$ | then | $Out = l_0$ |
| if | $E(t_1)$ | then | $Out = k_1$ |
| if | $G(t_1) and L(t_2)$ | then | $Out = l_1$ |
| if | $E(t_2)$ | then | $Out = k_2$ |
| if | $G(t_2) and L(t_3)$ | then | $Out = l_2$ |
| if | $E(t_3)$ | then | $Out = k_3$ |
| if | $G(t_3) and L(t_4)$ | then | $Out = l_3$ |
| if | $E(t_4)$ | then | $Out = k_4$ |
| if | $G(t_4)$ | then | $Out = l_4$ |

GRADE ARITHMETIC UNIT AND INPUT VALUE SORTER USED THEREIN

This is a continuation of application Ser. No. 08/105,335 filed Aug. 10, 1993, now abandoned.

BACKGROUND OF THE INVENTION

1. Field of the Invention

The present invention relates to a grade arithmetic unit in fuzzy inference and an input value sorter used in this grade arithmetic unit.

2. Description of the Related Art

When a conformity grade between a membership function and a fact is calculated in fuzzy inference using a MAX-MIN method, an input membership function showing the fact is generally compared by a minimum circuit with an antecedent portion membership function of a rule every discretization data and a smaller value of these membership functions is taken out. Thereafter, a maximum value of the membership functions is taken out and outputted as a conformity grade by a maximum circuit.

The conformity grade as an adaptation grade is calculated by using a fuzzy inferential circuit even when a fact input is provided as a determined value input. Namely, the determined value input is further set to a fuzzy input, or is used by enlarging this determined value input to a crisp set or aggregation.

Therefore, hardware for calculating the conformity grade is large-sized and there is naturally a limit of improvement of an accuracy in calculation of the conformity grade such as an accuracy in input and an accuracy in conformity grade. Further, it is necessary to provide a conformity grade in each of discrete positions of the antecedent portion membership function to this grade arithmetic unit. Accordingly, it is necessary to dispose a memory device for holding a large amount of data and a mechanism for reading these data from the memory device at a high speed.

In another example of the general grade arithmetic unit, minimum and maximum calculations are excluded by using a memory. For example, this general example is shown in Japanese Patent Application Laying Open (KOKAI) No. 2-159627. In this general example, a membership function name as a rule number is allocated to an upper address position and a discrete position of this membership function is allocated to a lower address position. A conformity grade is obtained from these address data by designating an input value and the membership function. In this general example, the conformity grade can be calculated at a high speed, but the memory has a large capacity. Accordingly, it is difficult to improve a processing accuracy such as an accuracy in input and an accuracy in conformity grade. Further, kinds of the membership function and the number of inputs thereof are limited.

SUMMARY OF THE INVENTION

It is therefore an object of the present invention to provide a grade arithmetic unit for suitably sorting an input value based on a parameter of a membership function by a simplified construction.

Another object of the present invention is to provide a grade arithmetic unit for calculating a conformity grade at a high speed from each of vertex data of a membership function defined as a polygon and a determined value input of the membership function and cheaply manufactured.

Another object of the present invention is to provide a grade arithmetic unit for easily parameterizing a membership function and making a storing means of the membership function compact and increasing a reading speed of data.

The above objects of the present invention can be achieved by a grade arithmetic unit having an input value sorter for calculating a conformity grade in a fuzzy inferential device, the sorter comprising comparing means for sequentially receiving data indicative of a position of each of vertexes of a membership function defined as a polygon and receiving fact data and sequentially comparing the fact data with the data indicative of the position of each of the vertexes; and means for specifying a side or vertex of the polygon belonging to the fact data on the basis of compared results of the comparing means and an input order of the vertexes.

The above objects of the present invention can be also achieved by a grade arithmetic unit in a fuzzy inferential device for calculating a conformity grade based on a membership function and fact data and constructed such that the conformity grade for the fact data is calculated on the basis of the fact data and data indicative of a position of each of vertexes of the membership function defined as a polygon. The conformity grade in the position of each of the vertexes of the polygon is preferably set to a maximum or zero grade. Further, the grade arithmetic unit preferably comprises inverting means for inverting bits indicative of the calculated grade results according to whether the fact data are provided in a position on a rightward rising oblique side of the membership function defined as a polygon or a position on a rightward failing oblique side of the membership function. Furthermore, an output of the input value sorter can be used as a bit-inverting selecting signal of the inverting means.

In the grade arithmetic unit of the present invention, data indicative of a position of each of vertexes of the membership function defined as a polygon are sequentially inputted to the comparing means. Further, fact data are also inputted to the comparing means. The comparing means sequentially compares the data indicative of each of the vertexes and a determined value shown by the fact data with each other. A side or vertex of the polygon belonging to the fact data is specified on the basis of the compared, results of the comparing means and an input order of the vertexes.

In the grade arithmetic unit of the present invention, a conformity grade for the fact data is calculated on the basis of the data indicative of the position of each of the vertexes of the membership function defined as a polygon and the fact data.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a grade arithmetic unit and an input value sorter used therein in the present invention will next be described in detail with reference to the accompanying drawings.

Figure 1:
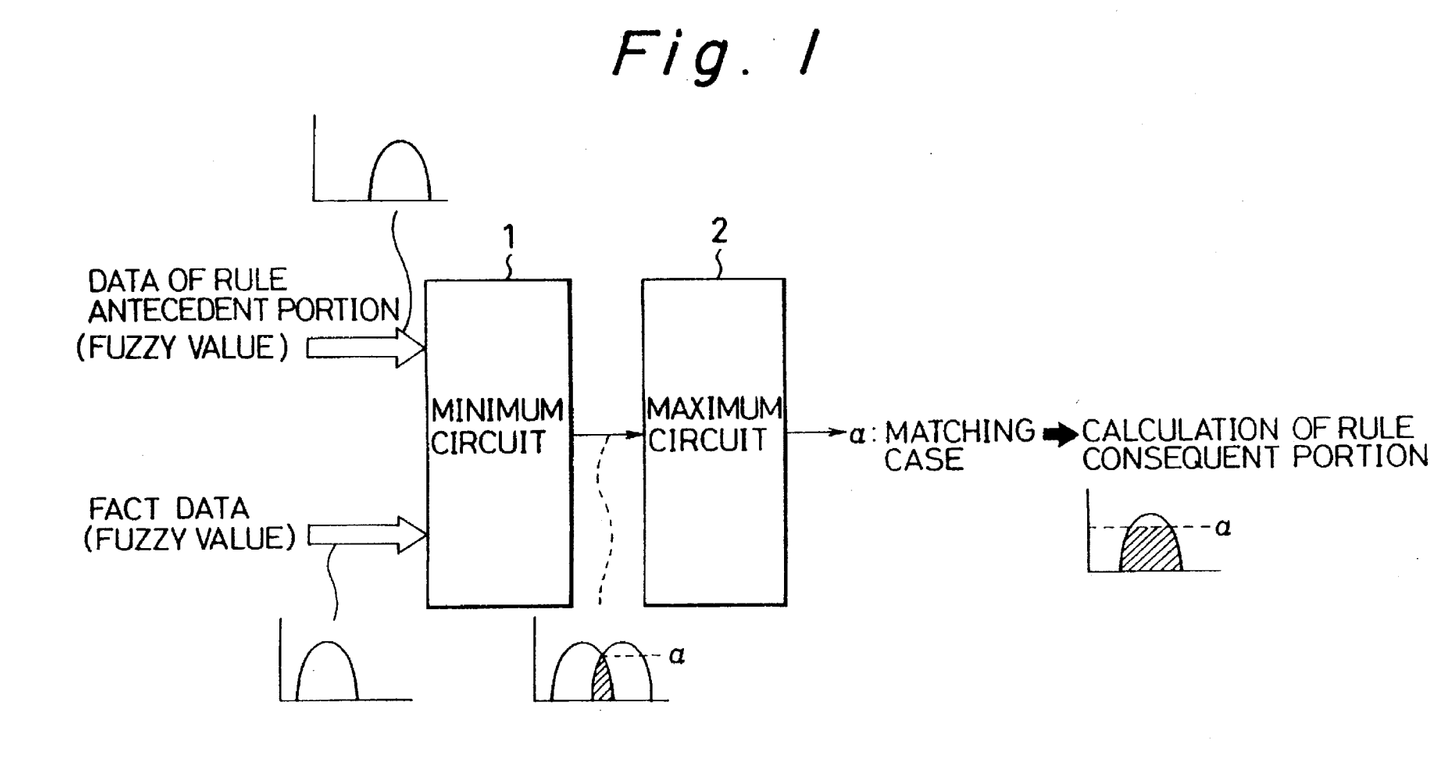
FIG. 1 is an electric block diagram showing a fuzzy inferential circuit in a general grade arithmetic unit.

As shown in FIG. 1, when a conformity grade between a membership function and a fact is calculated in fuzzy inference using a MAX-MIN method, an input membership function showing the fact is generally compared by a minimum circuit 1 with an antecedent portion membership function of a rule every discretization data and a smaller value of these membership functions is taken out. Thereafter, a maximum value of the membership functions is taken out and outputted as a conformity grade by a maximum circuit 2.

The conformity grade as an adaptation grade is calculated by using a fuzzy inferential circuit shown in FIG. 1 even when a fact input is provided as a determined value input. Namely, the determined value input is further set to a fuzzy input, or is used by enlarging this determined value input to a crisp set or aggregation.

Therefore, hardware for calculating the conformity grade is large-sized and there is naturally a limit of improvement of an accuracy in calculation of the conformity grade such as an accuracy in input and an accuracy in conformity grade. Further, it is necessary to provide a conformity grade in each of discrete positions of the antecedent portion membership function to this grade arithmetic unit. Accordingly, it is necessary to dispose a memory device for holding a large amount of data and a mechanism for reading these data from the memory device at a high speed.

Figure 2:
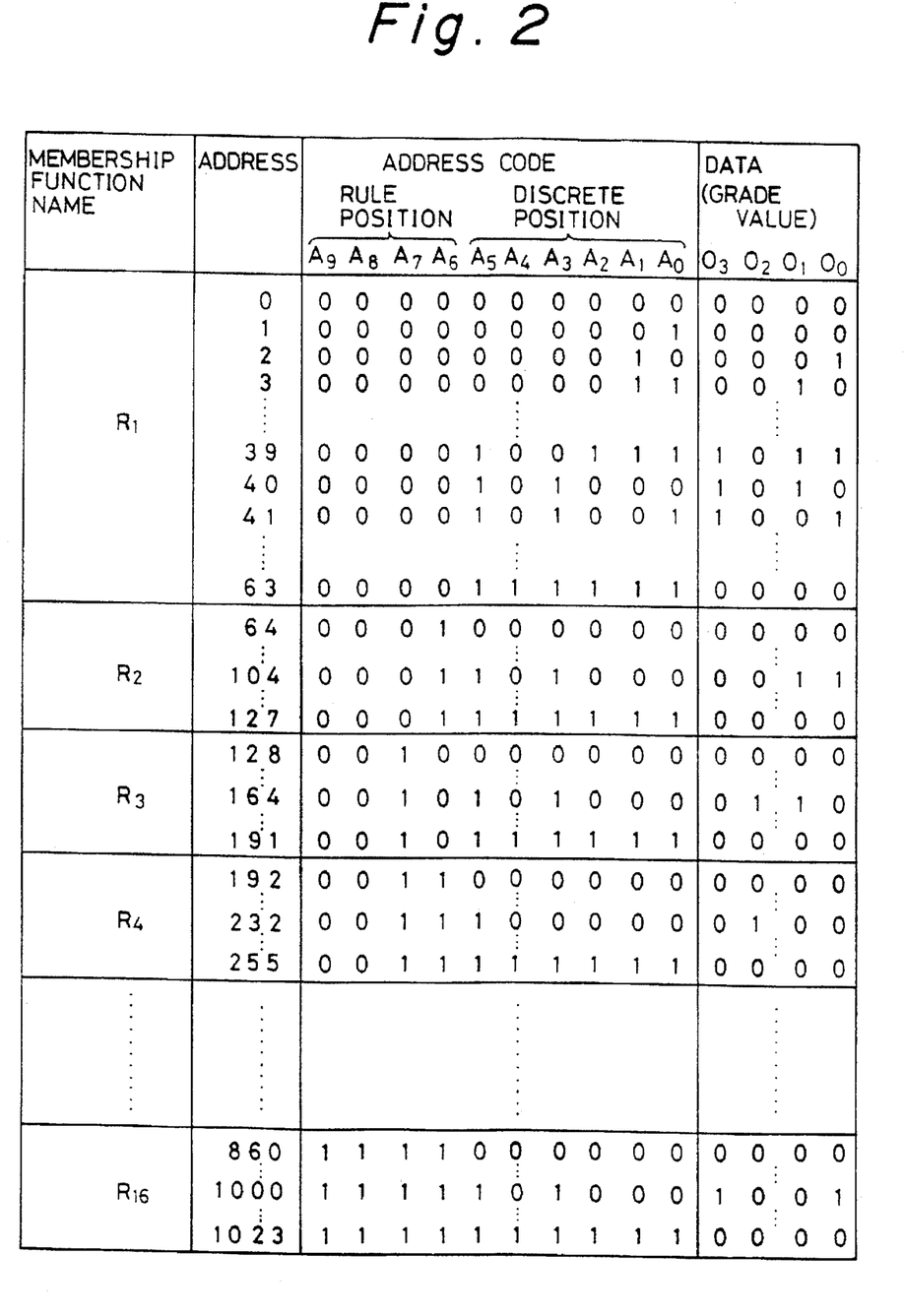
FIG. 2 is a typical view showing contents of a memory for storing a membership function used in another example of the general grade arithmetic unit.

In another example of the general grade arithmetic unit, minimum and maximum calculations are excluded by using a memory. For example, this general example is shown in Japanese Patent Application Laying Open (KOKAI) No. 2-159627. In this general example, a membership function name as a rule number is allocated to an upper address position and a discrete position of this membership function is allocated to a lower address position. A conformity grade is obtained from these address data by designating an input value and the membership function. FIG. 2 shows an example in which such a memory is used. In this general example, the conformity grade can be calculated at a high speed, but the memory has a large capacity. Accordingly, it is difficult to improve a processing accuracy such as an accuracy in input and an accuracy in conformity grade. Further, kinds of the membership function and the number of inputs thereof are limited.

An input value sorter in accordance with a first embodiment of the present invention will first be described with reference to FIGS. 3 to 5.

Figure 3:
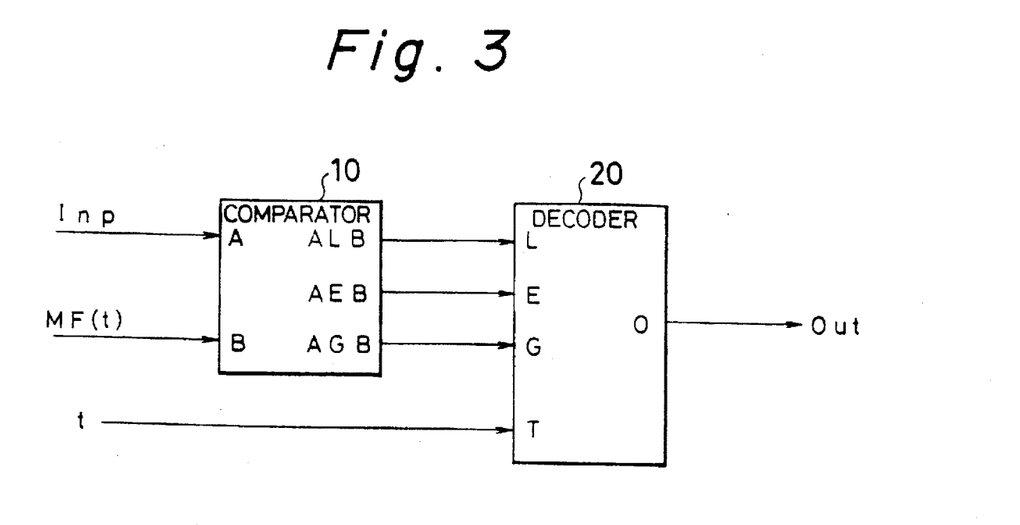
FIG. 3 is an electric block diagram showing the construction of an input value sorter for calculating a conformity grade in the present invention.

FIG. 3 shows an input value sorter for calculating a conformity grade in a fuzzy inferential device.

The input value sorter for calculating a conformity grade is constructed by a two-input comparator 10 and a decoder 20. The two-input comparator 10 compares a determined value input Inp inputted to an input terminal A with vertex position data MF(t) of a membership function inputted to an input terminal B. A>B shows that the determined value input Inp inputted to the input terminal A is greater than the vertex position data MF(t) of a membership function inputted to the input terminal B. A=B shows that the determined value input Inp inputted to the input terminal A is equal to the vertex position data MF(t) of a membership function inputted to the input terminal B. A<B shows that the determined value input Inp inputted to the input terminal A is smaller than the vertex position data MF(t) of a membership function inputted to the input terminal B. One or more of A>B, A=B, and A<B are outputted from corresponding output terminals ALB, AEB, and AGB as compared results of the comparator 10. Thus, the compared results of the two-input comparator 10 are transmitted to the decoder 20. The comparator 10 constitutes a comparing means in the present invention. The decoder 20 constitutes a means for specifying a polygonal side or vertex belonging to fact data in the present invention.

Figure 4:
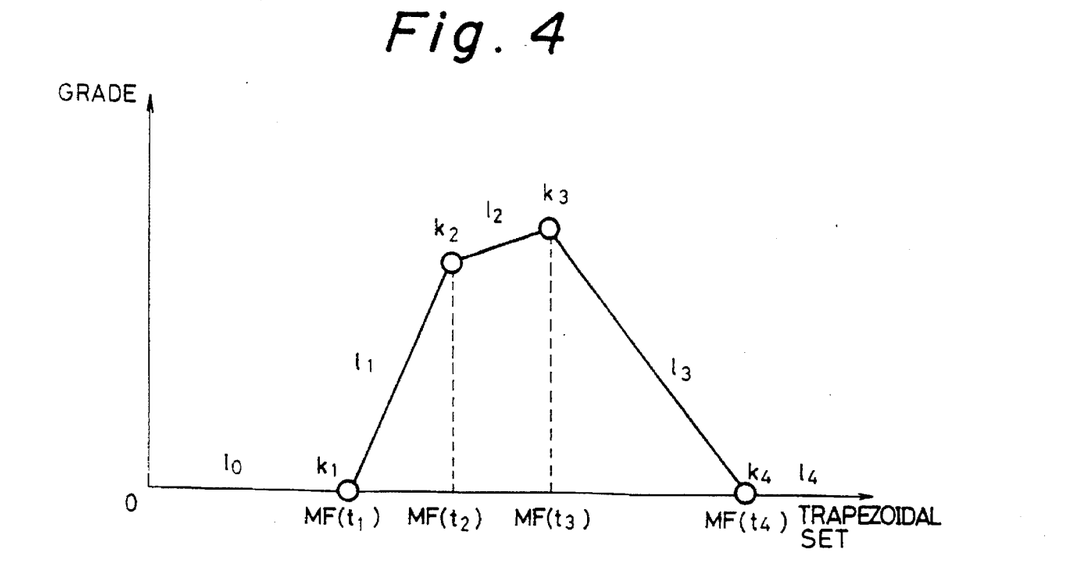
FIG. 4 is a graph showing one example of a membership function inputted to the input value sorter for calculating a conformity grade.
Figure 5:
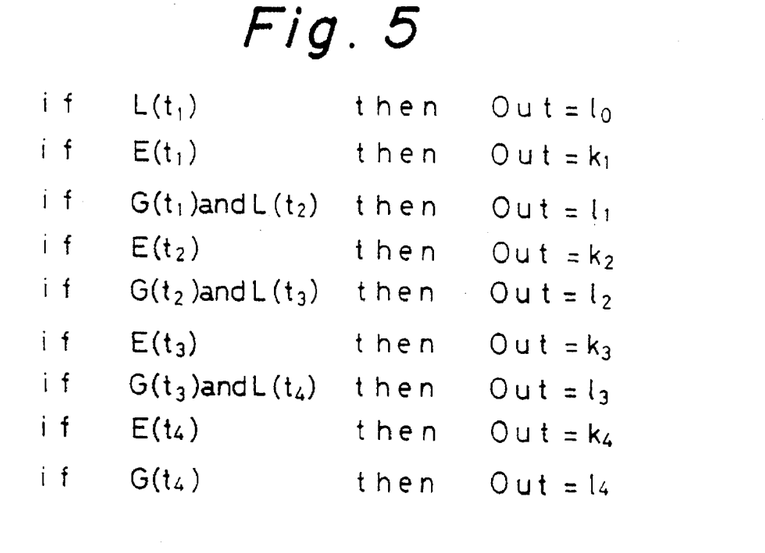
FIG. 5 is a table showing a processing rule provided by a decoder in the input value sorter for calculating a conformity grade.

FIG. 4 shows an example of the inputted membership function. In this example, the membership function has four vertexes $k_1$, $k_2$, $k_3$ and $k_4$. Vertex position data MF(t) are sequentially inputted to the input terminal B from a left-hand vertex. Each of signals t1 to t4 shows input order and timing. When the input order is fixedly set, each of these signals may be set to a signal showing only input timing such as a clock signal, etc. Each of $I_1$, $I_2$, $I_3$ and $I_4$ shows a side of the membership function.

The decoder 20 can be constructed by a combination of AND, OR, D-FF (D flip-flop) circuits, etc. The decoder 20 can be also constructed by using a PLD, a microcomputer, etc. FIG. 5 shows one example of a decoding system of the decoder 20 in a format of "if - then". In FIG. 5, Out shows sorted results of the input value sorter. The vertexes $k_1$ to $k_4$ may be respectively included on sides $I_0$ to $I_4$ with respect to the sorted results Out. It is not necessary to discriminate $I_0$ and $I_4$ from each other since the sorted results are provided in preprocessing for calculating a conformity grade.

A grade arithmetic unit in accordance with a second embodiment of the present invention will next be described with reference to FIGS. 6 to 8.

Figure 6:
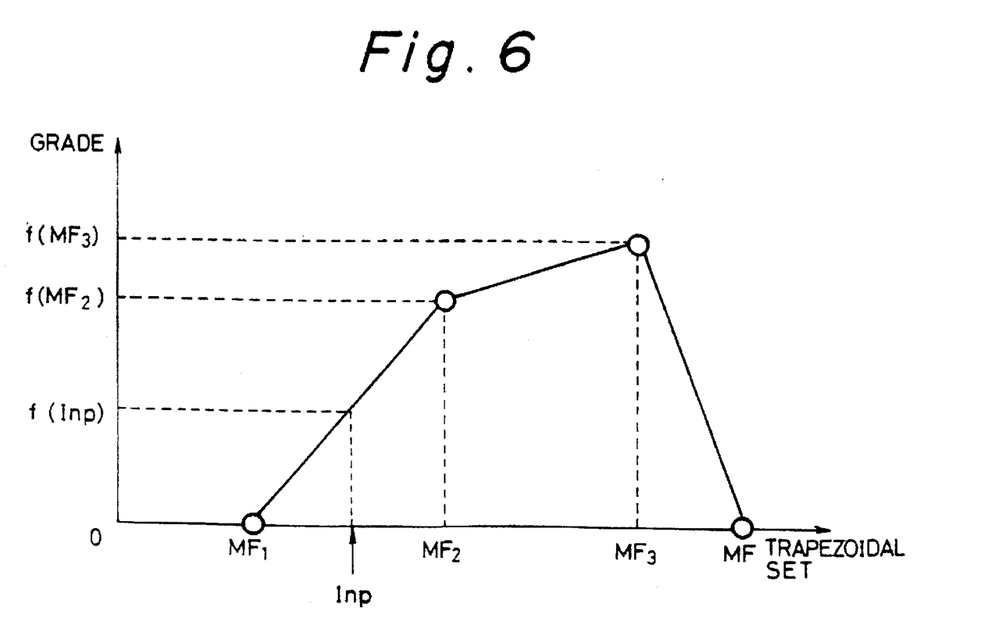
FIG. 6 is a graph showing a polygonal membership function in which a conformity grade in a vertex position can be also set to an intermediate value except for maximum and zero grades.

FIG. 6 shows an example of a polygonal membership function in which a conformity grade in a vertex position can be also set to an intermediate value except for maximum and zero grades.

When a determined value input Inp on an oblique side of this membership function from $MF_1$ to $MF_2$ is provided, a conformity grade value corresponding to this determined value input Inp is calculated by the following first calculating formula.

$$f(Inp) = \{(Inp - MF_1)/(MF_2 - MF_1)\} \times f(MF_2) \quad (1)$$

In this first calculating formula, $f(MF_i)$ shows a conformity grade in a vertex position $MF_i$.

Similarly, a conformity grade value on an oblique side of the membership function from $MF_3$ to $MF_4$ is calculated by the following second calculating formula.

$$f(Inp) = \{(MF_4 - Inp)/(MF_4 - MF_3)\} \times f(MF_3) \quad (2)$$

Figure 7:
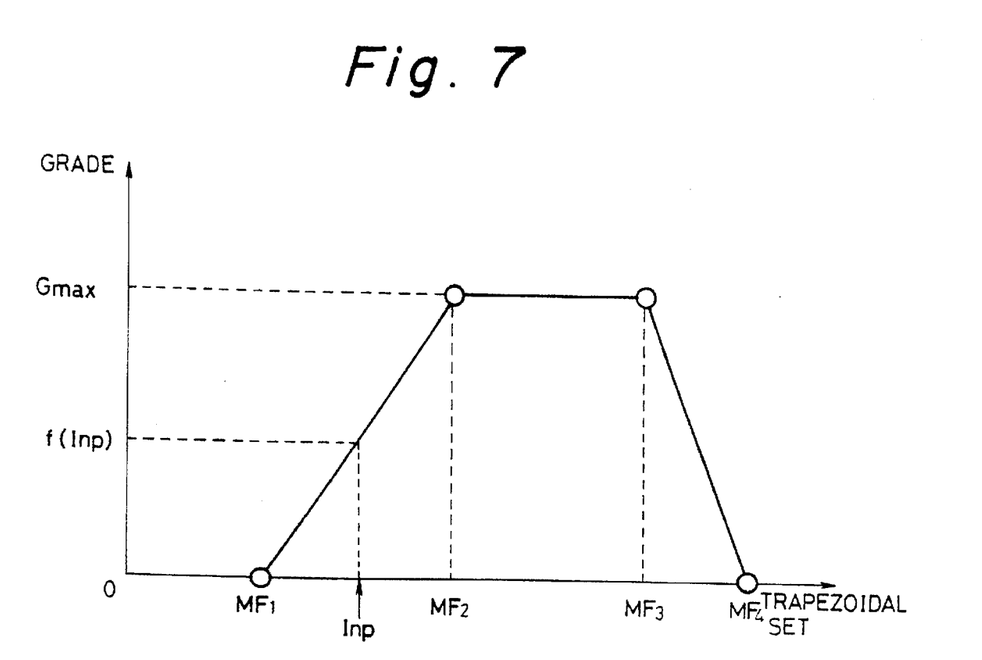
FIG. 7 is a graph showing a polygonal membership function in which a conformity grade in a vertex position is set to only a maximum or zero grade.

FIG. 7 shows an example of a polygonal membership function of the present invention in which a conformity grade in a vertex position is set to only a maximum or zero grade. A conformity grade on an oblique side of this membership function from $MF_1$ to $MF_2$ is sufficiently calculated by the following third calculating formula.

$$f(Inp) = (Inp - MF_1)/(MF_2 - MF_1) \quad (3)$$

The reasons for use of this third calculating formula are as follows. Namely, it is necessary to use a product term Gmax as a maximum conformity grade corresponding to $f(MF_2)$ in the above first calculating formula. However, this product term Gmax is a constant number and disappears in a defuzzifying operation in fuzzy inference so that no defuzzifying results are influenced by this product term.

Similarly, a conformity grade on an oblique side of the membership function from $MF_3$ to $MF_4$ is sufficiently calculated by the following fourth calculating formula.

$$f(Inp) = (MF_4 - Inp)/(MF_4 - MF_3) \quad (4)$$

Figure 8:
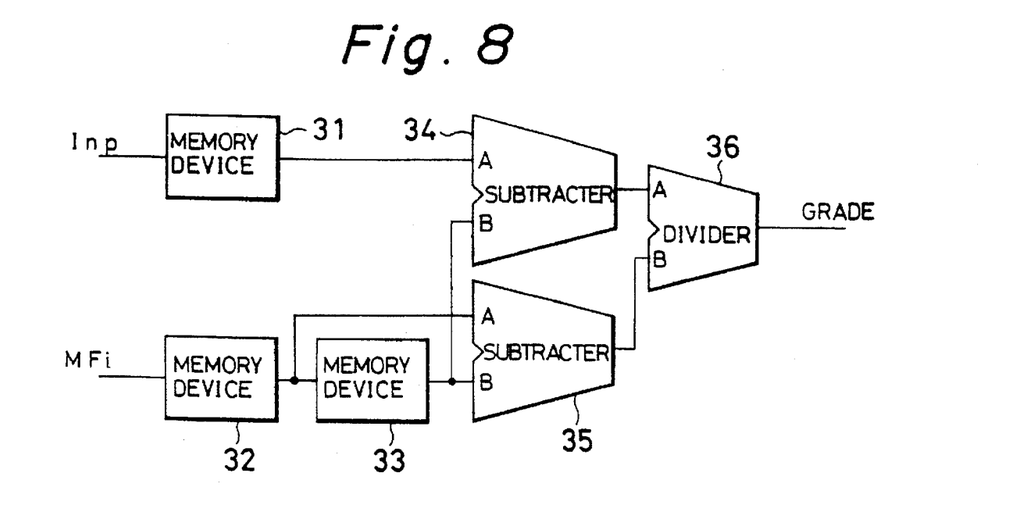
FIG. 8 is an electric block diagram showing the construction of a grade arithmetic unit in the present invention.

FIG. 8 shows a grade arithmetic unit of the present invention.

For example, this grade arithmetic unit calculates a conformity grade f(Inp) in the position of a determined value input Inp on an oblique side of the membership function from $MF_1$ to $MF_2$ in FIG. 7. In this case, a memory device 31 stores and holds a value of the determined value input Inp. A memory device 32 stores and holds vertex position data $MF_2$. A memory device 33 stores and holds vertex position data $MF_1$.

A subtracter 34 calculates a subtracted value $(Inp - MF_1)$ as a numerator in the above third calculating formula. A subtracter 35 calculates a subtracted value $(MF_2 - MF_1)$ as a denominator in the above third calculating formula. A divider 36 divides the numerator value $(Inp - MF_1)$ by the denominator value $(MF_2 - MF_1)$ on the basis of the subtracted results of the subtracters 34 and 35 in accordance with the third calculating formula, thereby obtaining a conformity grade f(Inp).

A grade arithmetic unit in accordance with a third embodiment of the present invention will next be described with reference to FIGS. 9 and 10.

Figure 9:
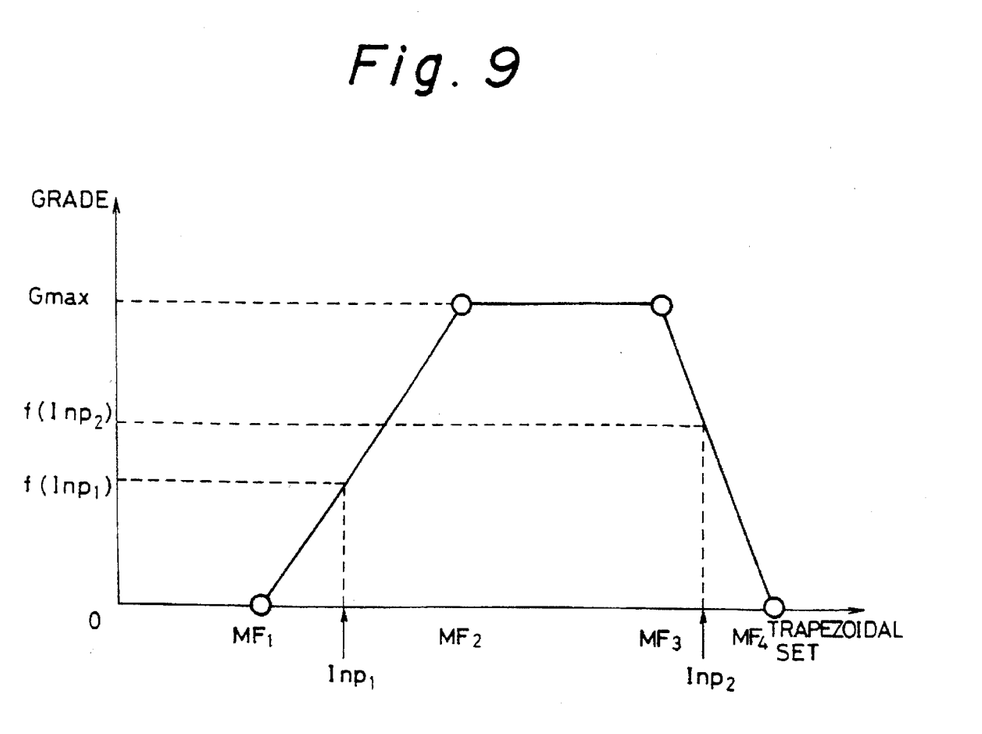
FIG. 9 is a graph showing a polygonal membership function in which a conformity grade in a vertex position is set to only a maximum or zero grade.

FIG. 9 shows an example of a polygonal membership function in which a conformity grade in a vertex position is set to only a maximum or zero grade. In FIG. 9, each of reference numerals Inp1 and Inp2 designates a determined value input. When Inp1 is set to an input value on a rightward rising oblique side of the membership function from $MF_1$ to $MF_2$ and Inp2 is set to an input value on a rightward falling oblique side of the membership function from $MF_3$ to $MF_4$, a conformity grade corresponding to this input value Inp1 is calculated by the above third calculating formula.

In contrast to this, a conformity grade corresponding to the input value Inp2 is calculated by the above fourth calculating formula. In this case, this conformity grade can be approximately provided by inverting all bits indicative of the ratio (MF4-Inp)/$(MF_4 - MF_3)$ for the following reasons. Namely, in the inversion of all the bits, a negative number is converted to a number smaller by one than a positive number having an absolute value equal to that of the negative number. However, no fuzzy inferential results are really influenced by this number error in conversion of the negative number so that this number error can be neglected.

Accordingly, the conformity grades on the rightward rising oblique side and the rightward failing oblique side of the membership function can be calculated by the same grade arithmetic unit and the same calculating method. Therefore, these two conformity grades can be discriminated from each other by only existence and non-existence of the bit inversion.

Figure 10:
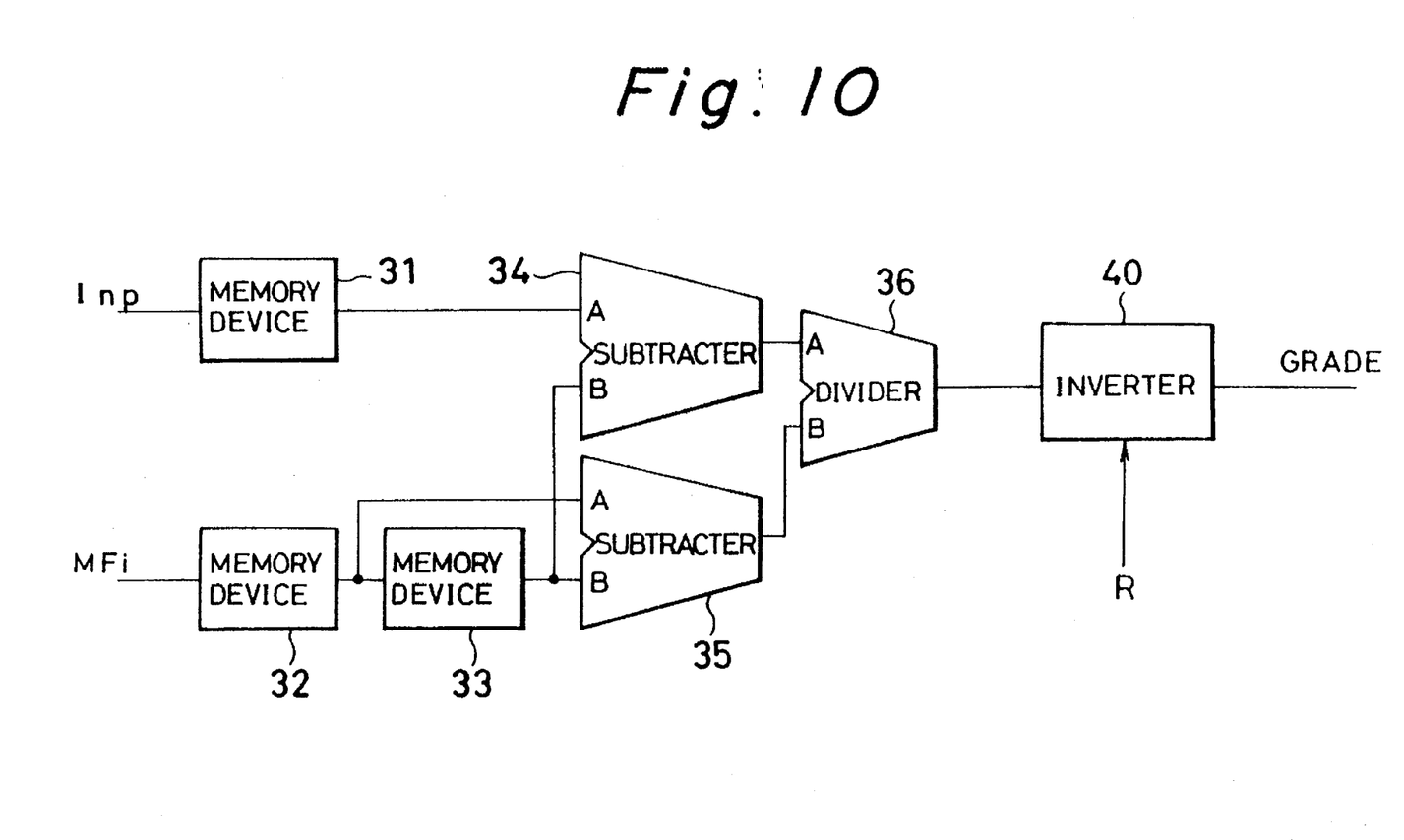
FIG. 10 is an electric block diagram showing the construction of another grade arithmetic unit in the present invention.

FIG. 10 shows another grade arithmetic unit of the present invention. In FIG. 10, the same constructional portions as FIG. 8 are designated by the same reference numerals and an explanation about these constructional portions is omitted in the following description. The operation of an inverter 40 is controlled by a selecting signal R indicative of inversion or non-inversion determined according to whether a conformity grade to be calculated is located on a rightward rising oblique side or a rightward falling oblique side. When the conformity grade is located on the rightward rising oblique side, the inverter 40 outputs all bit information as they are. Namely, the inverter 40 outputs non-inverted bit information. In contrast to this, when the conformity grade is located on the rightward falling oblique side, the inverter 40 inverts all the bits and outputs the inverted bit information.

Figure 11:
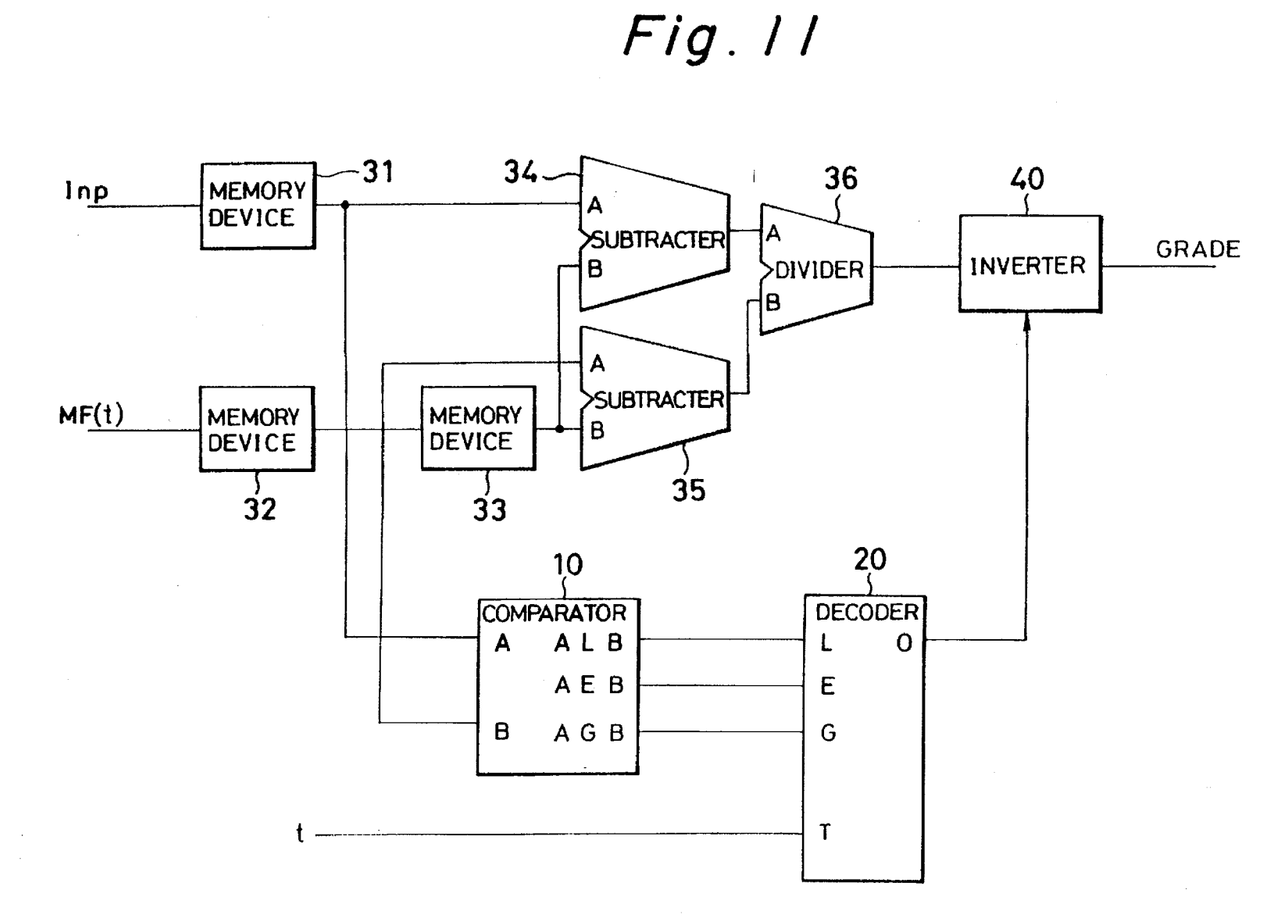
FIG. 11 is an electric block diagram showing the construction of another grade arithmetic unit in the present invention.

FIG. 11 shows a grade arithmetic unit in accordance with a fourth embodiment of the present invention.

In FIG. 11, the same constructional portions as FIG. 10 are designated by the same reference numerals and an explanation about these constructional portions is omitted in the following description. In this arithmetic unit, with respect to an output of the input value sorter shown in FIG. 3, information on rightward rising and falling oblique sides are used as the selecting input signal R of the bit inverter 40 shown in FIG. 10. Thus, conformity grades on the rightward rising and failing oblique sides are obtained by this grade arithmetic unit.

In a grade arithmetic unit of the present invention, a membership value as a conformity grade corresponding to fact data as a determined value input is calculated with respect to a membership function defined as a polygon. In this grade arithmetic unit, an input value can be suitably sorted in advance by a simplified construction. Therefore, the grade arithmetic unit can be made compact and operated at a high speed. Accordingly, cost of the entire grade arithmetic unit is reduced and operated with high accuracy.

In this grade arithmetic unit of the present invention, the membership function can be represented by only vertex data of the polygon. Accordingly, a memory for storing the membership function, etc. can be greatly saved and a processing speed of data can be increased by reducing the number of read data.

Further, no multiplier is required by limiting a conformity grade in a vertex position of the membership function to a maximum or zero grade. Accordingly, the arithmetic unit can be made compact and operated at a high speed. It is also unnecessary to dispose a region for holding a conformity grade value in the memory for storing the membership function, etc. Therefore, the arithmetic unit can be made compacter and a reading speed of data can be increased.

When a bit inverting means is further disposed, conformity grades on rightward rising and falling oblique sides of the membership function can be calculated by the same grade arithmetic unit and the same calculating method so that a circuit structure of the arithmetic unit can be made compact.

Furthermore, the circuit structure of the arithmetic unit can be more effectively made compact and operated at a high speed by using an output of an input value sorter in the present invention as a bit-inverting selecting signal of the bit inverting means.

Many widely different embodiments of the present invention may be constructed without departing from the spirit and scope of the present invention. It should be understood that the present invention is not limited to the specific embodiments described in the specification, except as defined in the appended claims.

What is claimed is:

1. A grade arithmetic unit in a fuzzy inferential device, comprising:

a first memory means for storing data indicative of a position of each of vertexes of a membership function in a predetermined order, said membership function being defined as a polygon;

a second memory means for storing fact data;

an input value sorter for calculating a conformity grade for the fact data on the basis of the fact data and the data indicative of the position of each of the vertexes of the membership function defined as the polygon; and inverting means for inverting bits indicative of the calculated grade results according to whether the fact data are provided in a position on a rightward rising oblique side of the membership function defined as the polygon or a position on a rightward falling oblique side of the membership function, said input value sorter including:

comparing means for sequentially receiving the data indicative of the position of each of the vertexes of the membership function from the first memory means in the predetermined order and receiving the fact data from the second memory means and sequentially comparing the fact data with the data indicative of the position of each of the vertexes of the membership function; and means for specifying a side or vertex of said polygon belonging to the fact data on the basis of compared results of said comparing means and the predetermined order, wherein an output of the input value sorter is used as a bit-inverting selecting signal of the inverting means.

2. A grade arithmetic unit as claimed in claim 1, wherein the conformity grade in the position of each of the vertexes of said polygon is set to a maximum or zero grade.

3. A grade arithmetic unit in a fuzzy inferential device having a plurality of fuzzy rules, the grade arithmetic unit calculating a conformity grade between a membership function in an antecedent portion and a fact, said membership function being defined as a polygon, comprising:

a first memory means for storing data indicative of a position of each of vertexes of the membership function in a predetermined order;

a second memory means for storing fact data;

means for sequentially receiving the data indicative of the position of each of the vertexes of the membership function from the first memory means and receiving the fact data from the second memory means and calculating a conformity grade for the fact data on the basis of the fact data and the data indicative of the position of each of the vertexes of the membership function defined as the polygon; and inverting means for inverting bits indicative of the calculated grade results according to whether the fact data are provided in a position on a rightward rising oblique side of the membership function defined as the polygon or a position on a rightward failing oblique side of the membership function;

wherein said sequential receiving means includes an input value sorter for calculating the conformity grade having:

comparing means for sequentially receiving the data indicative of the position of each of the vertexes of the membership function from the first memory means in the predetermined order and receiving the fact data from the second memory means and sequentially comparing the fact data with the data indicative of the position of each of the vertexes of the membership function; and means for specifying a side of vertex of said polygon belonging to the fact data on the basis of compared results of said comparing means and the predetermined order, and wherein an output of the input value sorter is used as a bit-inverting selecting signal of the inverting means.

4. A grade arithmetic unit as claimed in claim 3, wherein the conformity grade in the position of each of the vertexes of said polygon is set to a maximum or zero grade.

5. A grade arithmetic unit in a fuzzy inferential device having a plurality of fuzzy rules, the grade arithmetic unit calculating a conformity grade between a membership function in an antecedent portion and a fact, said membership function being defined as a polygon, comprising:

a first memory to store data indicative of a position of each of vertexes of the membership function in a predetermined order;

a second memory to store fact data;

an input value sorter configured to calculate the conformity grade, said input value sorter sequentially receives the data indicative of the position of each of the vertexes of the membership function from the first memory in the predetermined order and the fact data from the second memory and sequentially compares the fact data with the data indicative of the position of each of the vertexes of the membership function, and specifies a side of vertex of said polygon belonging to the fact data on the basis of compared results of said comparing means and the predetermined order, and an output of the input value sorter is used as a bit-inverting selecting signal of the inverter; and an inverter configured to invert bits indicative of the calculated grade results according to whether the fact data are provided in a position on a rightward rising oblique side of the membership function defined as the polygon or a position on a rightward falling oblique side of the membership function.

6. A grade arithmetic unit as claimed in claim 5, wherein said input value sorter includes a comparator that sequentially receives the data indicative of the position of each of the vertexes of the membership function from the first memory in the predetermined order, and that receives the fact data from the second memory and sequentially compares the fact data with the data indicative of the position of each of the vertexes of the membership function, and a decoder that specifies a side of vertex of said polygon belonging to the fact data on the basis of compared results of said comparing means and the predetermined order, and an output of the input value sorter is used as a bit-inverting selecting signal of the inverter.

* * * * *